March 19, 1929.  E. M. BUSSINGER  1,706,053

WINDOW WIPER

Filed Sept. 8, 1927

INVENTOR
Eugene M. Bussinger
By E. J. Andrews
Atty.

Patented Mar. 19, 1929.

1,706,053

UNITED STATES PATENT OFFICE.

EUGENE M. BUSSINGER, OF CHICAGO, ILLINOIS.

WINDOW WIPER.

Application filed September 8, 1927. Serial No. 218,161.

This invention relates to window wipers such as are called squeegees by the trade, and ordinarily comprising a rubber strip mounted in a holder. One of the objects of the invention is to provide an improved form of rubber strip and improved means for holding the rubber strip in the handle frame. A particular object is to form these elements so that the strip can be conveniently and quickly removed from the frame and a new one placed in the frame. Another object of the invention is to provide what I call a four-in-one squeegee which has four operating edges, each of which can be conveniently placed in an operating position in the handle of the frame so that when one edge becomes dulled, another edge can be placed in position for use.

Figure 1:
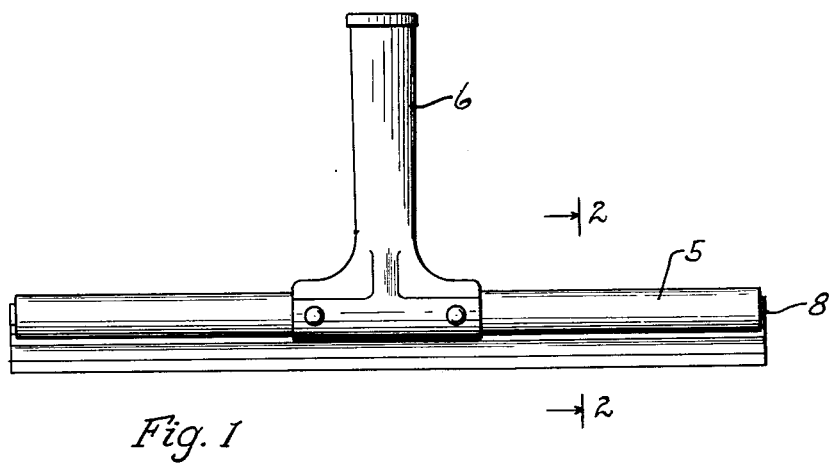
Figure 2:
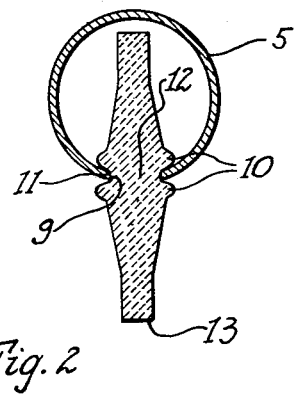

Of the accompanying drawings, Fig. 1 is a plan view of a squeegee which embodies the features of my invention; Fig. 2 is an enlarged sectional view along the line 2—2 of Fig. 1; and Fig. 3 is a sectional view showing a modified form of rubber which may be used as a part of my invention.

The squeegee which I illustrate as an embodiment of my invention, comprises a holding frame 5, to which is fastened a handle 6. The frame, preferably consists of a cylindrical member of rigid material, preferably material which has a slot 7 extending the full length, on one side, the edges of which are smooth and parallel. The operating member consists of a rubber strip 8, which has a sharp corner edge for wiping the glass in the ordinary manner. Extending longitudinally of the strip, and the full length thereof, are ridges 10. Preferably, there are two of these ridges one on each side of the central portion 12 of the strap. These ridges form longitudinal grooves 11. The width of the slot 9 is slightly less than the thickness of the rubber strip portion 12, between the bottoms of the grooves, and the strip is adapted to slip into the frame with the edges of the slot passing into the respective grooves. The rubber yields somewhat when it is pulled into the frame, and when in position, it is firmly held in place by the edges of the slot. If one of the edges 13 becomes dulled, it is necessary only to pull the strip longitudinally from the frame and turn it over and replace it. It may be merely turned with the other side up, or it may be turned with the other edge out.

It will thus be seen that I have provided a window-wiper which has four operating edges, any one of which may be placed in position for use without any mechanical changes in the holders, such as screwing bolts, or springing jaws apart. It is necessary only to pull the strip out from the slot, turn it into position, and slip it back into the slot. The frame, itself, consists merely of the holder 5, and the handle 6, and these may be rigidly riveted together for permanent use, or they may be welded together if desired.

Figure 3:
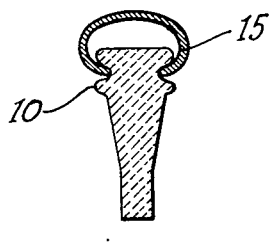

In Fig. 3, I have illustrated a modified form of the rubber strip which has only two edges for use. This makes a simpler and less expensive strip and may be used with a holder 15 having a shorter diameter, or otherwise differently shaped, if desired.

I claim as my invention:

In a window wiper, a rubber wiping strip having its long edges parallel and of material width and with sharp rectangular corners, the central longitudinal portions of the strip being materially thicker than the edges, and a longitudinal groove extending from one end of the strip to the other along the central portion of each side, the said grooves being parallel and opposite and being formed by a pair of longitudinal ridges extending from one end to the other on each side of the strip.

In testimony whereof, I hereunto set my hand.

EUGENE M. BUSSINGER.